United States Patent
Dutta

(10) Patent No.: US 9,154,381 B2
(45) Date of Patent: Oct. 6, 2015

(54) ENHANCED GSLB KEEPALIVE

(75) Inventor: Sanjoy Dutta, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 843 days.

(21) Appl. No.: 13/362,839

(22) Filed: Jan. 31, 2012

(65) Prior Publication Data

US 2013/0198365 A1    Aug. 1, 2013

(51) Int. Cl.
*G06F 15/173* (2006.01)
*H04L 12/24* (2006.01)
*H04L 12/26* (2006.01)
*H04L 29/08* (2006.01)
*H04L 29/14* (2006.01)

(52) U.S. Cl.
CPC ............ *H04L 41/0893* (2013.01); *H04L 43/10* (2013.01); *H04L 67/1002* (2013.01); *H04L 69/40* (2013.01)

(58) Field of Classification Search
CPC .......... H04L 43/04; H04L 43/08; H04L 43/10
See application file for complete search history.

(56) References Cited

PUBLICATIONS

Cisco, "Cisco Global Site Selector GUI-Based Global Server Load-Balancing Configuration Guide Software Version 2.0", Mar. 2007, all pages, http://www.cisco.com/c/en/us/td/docs/app_ntwk_services/data_center_app_services/gss4400series/v2-0/configuration/gui/gslb/guide/gui_gslb.pdf.*

* cited by examiner

*Primary Examiner* — Hua Fan
(74) *Attorney, Agent, or Firm* — Merchant & Gould

(57) ABSTRACT

Systems and methods are disclosed for designating a network device as a primary device for probing a virtual IP address and designating a second network device as a standby device for probing the virtual IP address. Results of probe requests may be shared with a plurality of network devices within a mesh.

11 Claims, 6 Drawing Sheets

ENHANCED GSLB KEEPALIVE

BACKGROUND

In current systems, global server load balancers may deploy in a mesh and probe to a Virtual IP address associated with a server load balancer. However, each of the global server load balancers in the mesh must probe each Virtual IP address. This leads to increased load on the server load balancer. Furthermore, the probe answer status may be dependent on network connectivity between the global server load balancer and the Virtual IP address. If that connection is down, the global server load balancers may respond with an "Offline" answer. Also, the global server load balancer mesh size cannot be increased without drastically increasing the load on the server load balancer. As such, there exists a need for a system for enhanced global server load balancer keepalive.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Figure 1:
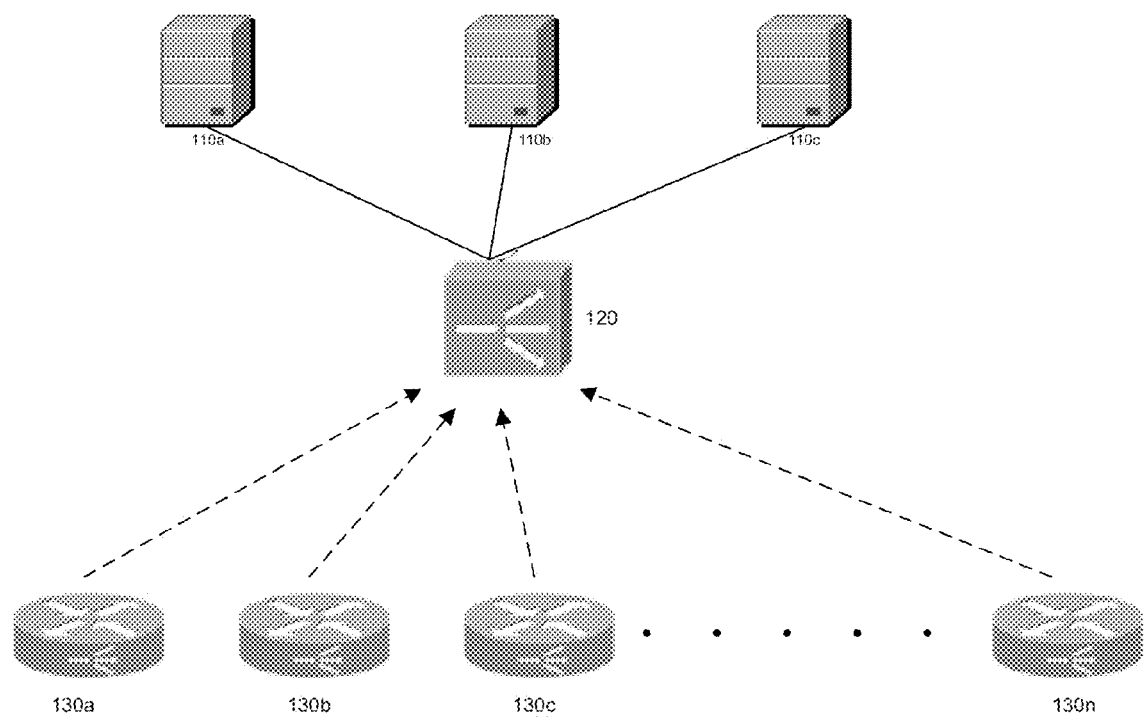
FIG. 1 is an illustration of an operating environment for embodiments described herein.

Consistent with embodiments of the present disclosure, systems and methods are disclosed for the enhanced keepalive of global server load balancer traffic.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

FIG. 1 illustrates an operating environment for current systems incorporating meshed global site selectors. For example, n global site selectors 130a-130n may each be in communication with a server load balancer 120. In some embodiments, server load balancer 120 may be in communication with a plurality of remote network devices, such as network devices 110a-110c.

Each of the global site selectors 130a-130n the mesh must probe each Virtual IP address. This leads to increased load on the server load balancer 120. Furthermore, the probe answer status may be dependent on network connectivity between the individual global site selector (e.g., 130a) and the Virtual IP address. If that connection is down, the global site selector 130a may respond with an "Offline" answer. Also, the global site selector mesh size cannot be increased without drastically increasing the load on server load balancer 120.

Figure 2:
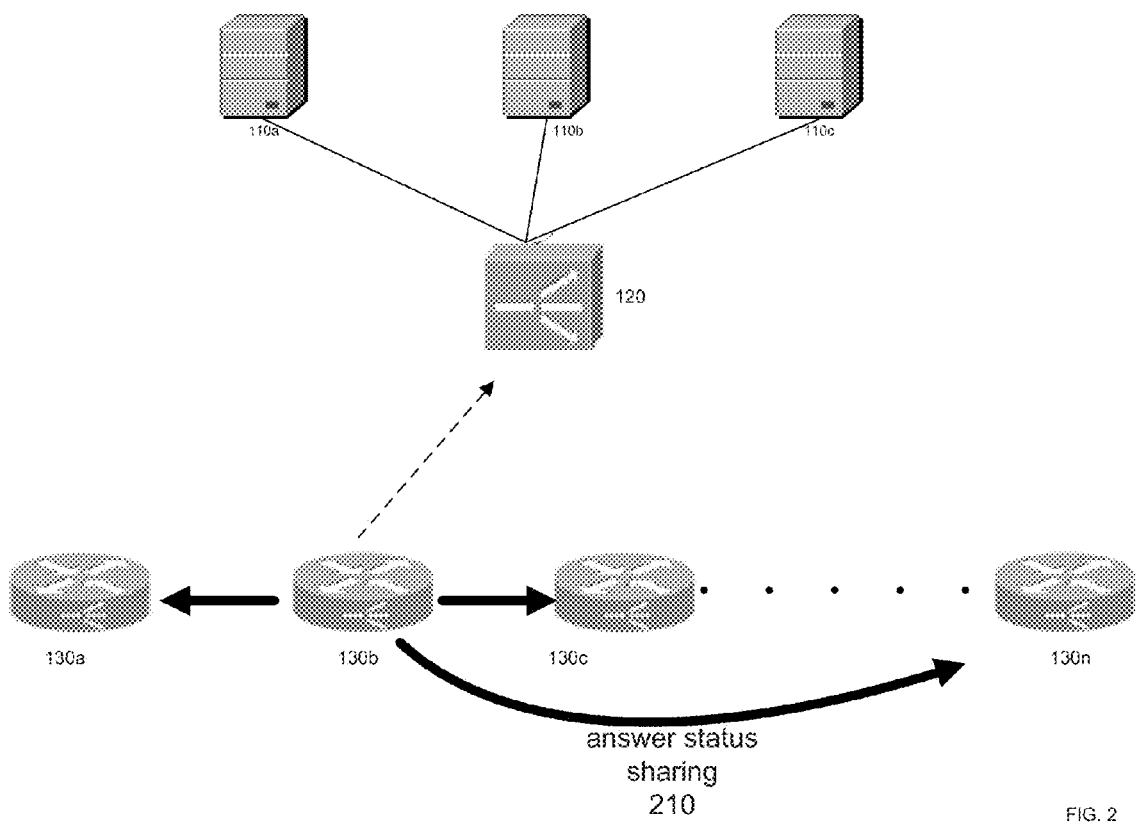
FIG. 2 is an illustration of an operating environment for embodiments described herein.

FIG. 2 illustrates an operating environment for embodiments of the present disclosure. A first global site selector 130a may be configured to probe a virtual IP address associated with server load balancer 120. The first global site selector 130a may be designated as a primary prober. A second global site selector may be configured to probe a virtual IP address associated with server load balancer 120 and designated as a standby prober.

The primary global site selector 130a may be responsible for distributing the answer status of the virtual IP connection to the remainder of global site selectors as illustrated by connection 210. To configure an environment corresponding to embodiments of the present disclosure, a number of global site selectors (n) are configured into a mesh with one of the global site selectors designated as a primary global site selector. Next, a Virtual IP connection may be configured to allow the sending of keepalive requests.

Figure 3:
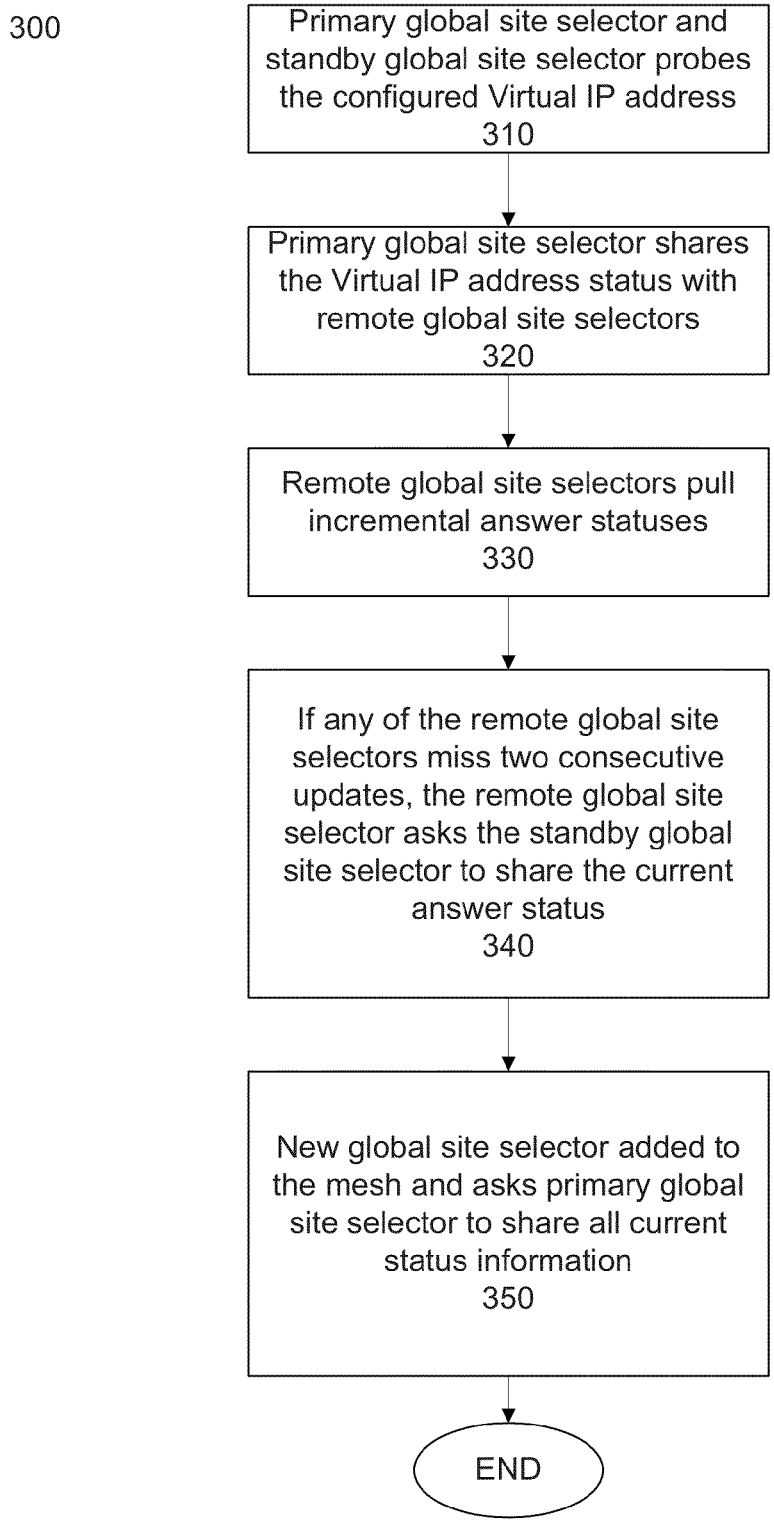
FIG. 3 is a flow chart of embodiments for enhancing GSLB keepalive.

FIG. 3 is a flow chart illustrating embodiments of the present disclosure. Method 300 may begin at step 310. At step 310, both primary global site selector 130a and standby global site selector 130b may probe to the configured Virtual IP address. Method 300 may continue to step 320 where primary global site selector 130a may share the Virtual IP address status with remote global site selectors 130c-130n. Notably, primary global site selector 130a does not have to share the Virtual IP address status with standby global site selector 130b.

Method 300 may proceed to step 330. At step 330, remote global site selectors 130c-130n may pull incremental answer statuses. In some embodiments, the frequency which global site selectors 130c-130n pull statuses may be configurable. The answer status may also be shared upon a change to the state has occurred or if system load has changed more than a predetermined amount.

Method 300 may then proceed to step 340 where if any of the global site selectors 130c-130n have missed two consecutive updates, the global site selectors 130c-130n may ask the standby global site selector 130b to share the current answer status. If the requesting global site selector fails to receive the status from standby global site selector 130b, the requesting global site may start probing the Virtual IP address as in conventional keepalive methods. Once the requesting global site gets a status update from the primary global site selector 130a, the probing may be discontinued.

At step 350 of method 300, a new global site selector (not shown) may be added to the mesh. The newly added global site selector may ask primary global site selector to share all current status information.

Figure 4:
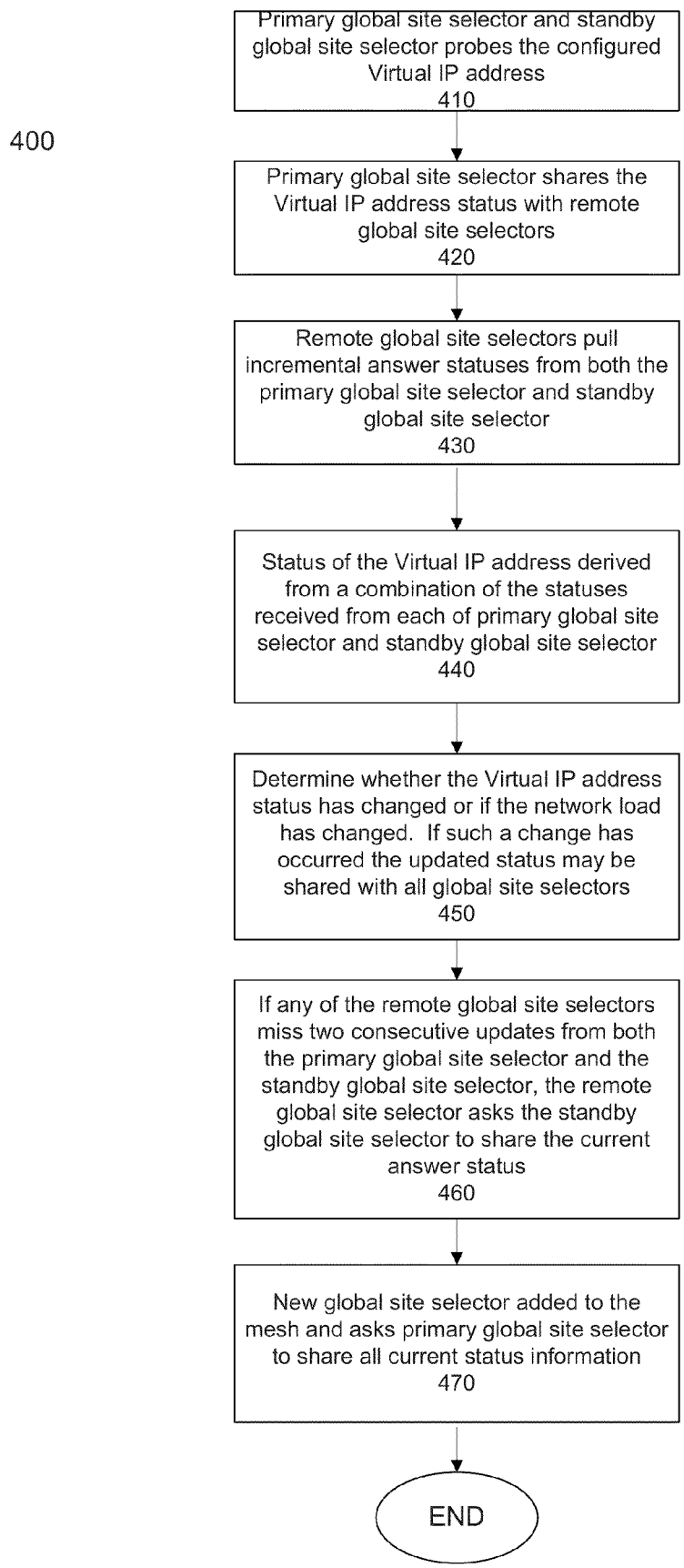
FIG. 4 is a flow chart of embodiments for enhancing GSLB keepalive.

FIG. 4 is a flow chart illustrating embodiments of the present disclosure. Method 400 may begin at step 410 where both primary global site selector 130a and standby global site selector 130b may probe to the configured Virtual IP address. Method 400 may continue to step 420 where primary global site selector 130a and standby global site selector 130b may both share the Virtual IP address status with all global site selectors 130a-130n.

Method 400 may proceed to step 430. At step 430, global site selectors 130c-130n may pull incremental answer statuses from both primary global site selector 130a and standby global site selector 130b. In some embodiments, the frequency which global site selectors pull statuses may be configurable. The answer status may also be shared upon a change to the state has occurred or if system load has changed more than a predetermined amount.

Method 400 may then proceed to step 440. At step 440, the status of the Virtual IP address may be derived from a combination of the statuses received from each of primary global site selector 130a and standby global site selector 130b. In some embodiments the status may be derived as (Virtual IP address status as reported by primary global site selector 130a||Virtual IP address status as reported by standby global site selector 130b). Alternatively, in some embodiments the status may be derived as (Virtual IP address status as reported by primary global site selector 130a && Virtual IP address status as reported by standby global site selector 130b).

Method 400 may proceed to step 450. At step 450, it may be determined whether the Virtual IP address status has changed or if the network load has changed as discussed above. If such a change has occurred the updated status may be shared with all global site selectors.

Method 400 may then proceed to step 460 where if any of the global site selectors 130a-130n have missed two consecutive updates from both primary global site selector 130a and standby global site selector 130b, the requesting global site may start probing the Virtual IP address as in conventional keepalive methods. Once the requesting global site gets a status update from either of primary global site selector 130a or standby global site selector 130b, the probing may be discontinued.

At step 470 of method 300, a new global site selector (not shown) may be added to the mesh. The newly added global site selector may ask primary global site selector 130a to share all current status information.

Figure 5:
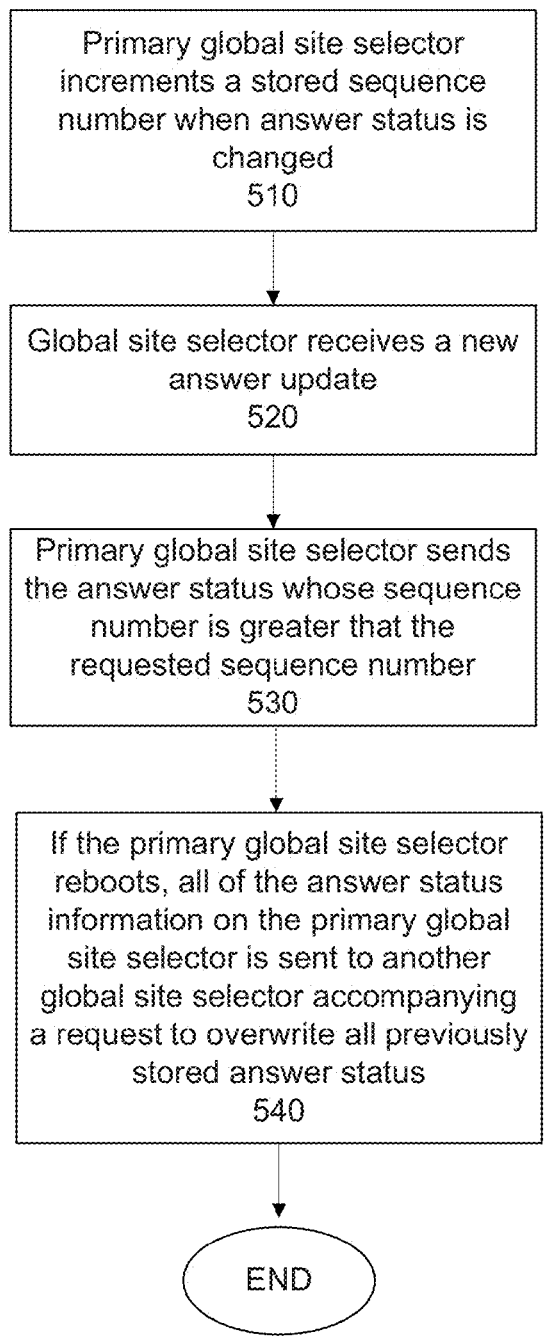
FIG. 5 is a flow chart of embodiments for enhancing GSLB keepalive.

FIG. 5 is a flow chart illustrating embodiments of the Virtual IP address sharing mechanism according to the present disclosure. Method 500 may begin at step 510 where a primary global site selector, such as primary global site selector 130a may increment a stored sequence number when an answer status is changed. In some embodiments, the sequence number may be attached to the answer itself. The answer may then be stored in a table.

Method 500 may proceed to step 520 when a global site selector receives a new answer update. The sequence number may again be incremented and stored in the table. This updated sequence number may be used in the next request. Method 500 may then proceed to step 530. At step 530, primary global site selector 130a may send the answer status whose sequence number is greater that the requested sequence number.

Method 500 may proceed to step 540. At step 540, if the primary global site selector 130a reboots, all of the answer status information on primary global site selector 130a may be sent to another global site selector accompanying a request to overwrite all previously stored answer status.

Figure 6:
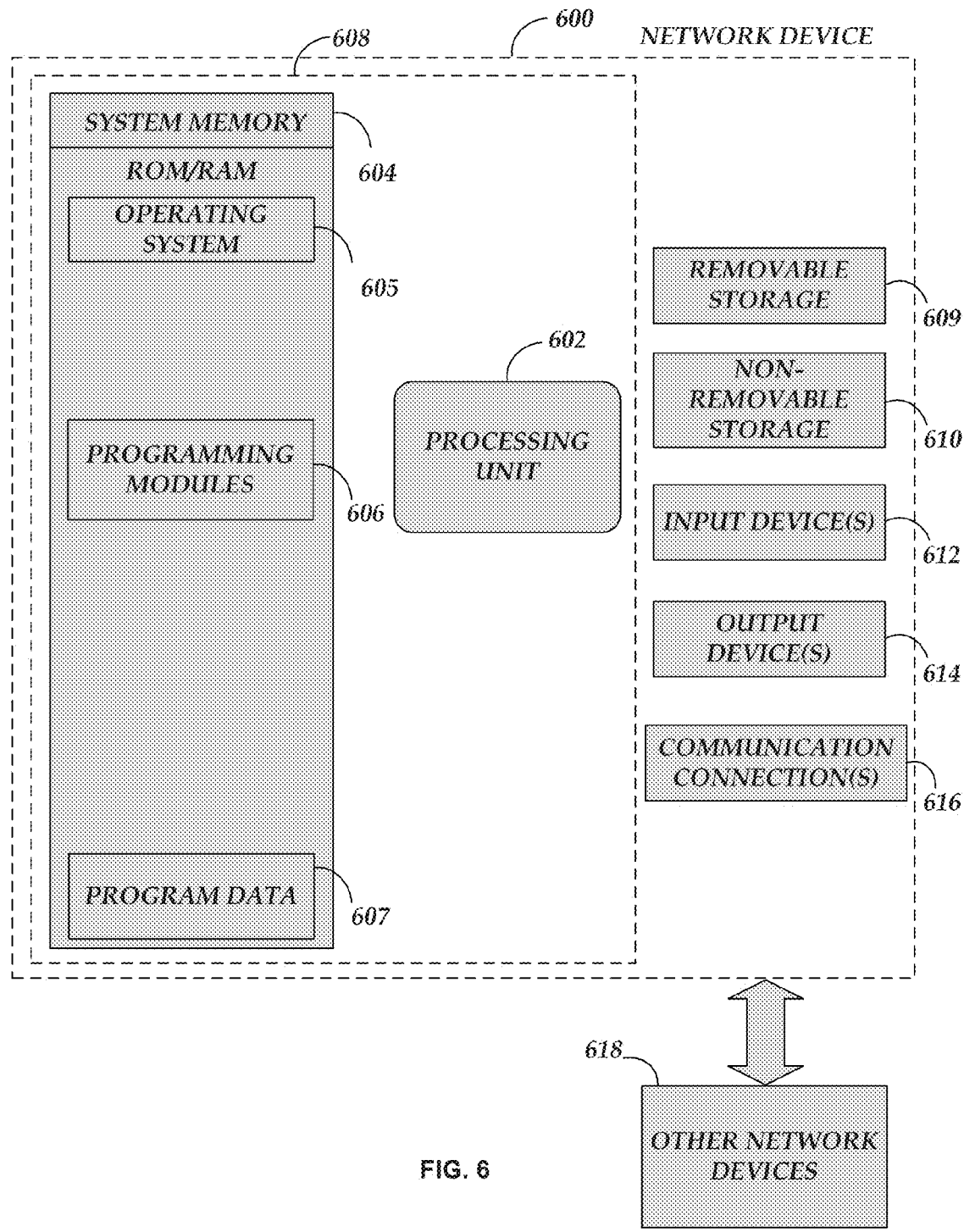
FIG. 6 is a block diagram of a network computing device.

FIG. 6 is a block diagram of a system including network device 600. Consistent with embodiments of the present disclosure, the aforementioned memory storage and processing unit may be implemented in a network device, such as network device 600 of FIG. 6. Any suitable combination of hardware, software, or firmware may be used to implement the memory storage and processing unit. For example, the memory storage and processing unit may be implemented with network device 600 or any of other network devices 618, in combination with network device 600. The aforementioned system, device, and processors are examples and other systems, devices, and processors may comprise the aforementioned memory storage and processing unit, consistent with embodiments of the present disclosure.

With reference to FIG. 6, a system consistent with embodiments of the present disclosure may include a network device, such as network device 600. In a basic configuration, network device 600 may include at least one processing unit 602, a secure processing unit for decryption 620, and a system memory 604. Depending on the configuration and type of network device, system memory 604 may comprise, but is not limited to, volatile (e.g., random access memory (RAM)), non-volatile (e.g., read-only memory (ROM)), flash memory, or any combination. System memory 604 may include operating system 605, one or more programming modules 606, and may include program data 607. Operating system 605, for example, may be suitable for controlling network device 600's operation. Furthermore, embodiments of the present disclosure may be practiced in conjunction with a graphics library, other operating systems, or any other application program and is not limited to any particular application or system. This basic configuration is illustrated in FIG. 6 by those components within a dashed line 608.

Network device 600 may have additional features or functionality. For example, network device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 600. Any such computer storage media may be part of device 600. Network device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Network device 600 may also contain a communication connection 616 that may allow device 600 to communicate with other network devices 618, such as over a network in a distributed network environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602 or secure processing unit for decryption 620, programming modules 606 may perform processes including, for example, one or more method 300, 400 and 500's stages as described above. The aforementioned process is an example; processing unit 602 and secure processing unit for decryption 620 may perform other processes.

Generally, consistent with per-subscriber stream management according to embodiments of this invention, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments of the present disclosure may also be practiced in distributed network environments where tasks are performed by remote processing devices that are linked through a communications network. In a distributed network environment, program modules may be located in both local and remote memory storage devices.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present disclosure, for example, may be implemented as a computer process (method), a network system, or as an article of manufacture, such as a computer program product or computer readable media. The computer program product may be a computer storage media readable by a computer system and encoding a computer program of instructions for executing a computer process. The computer program product may also be a propagated signal on a carrier readable by a network system and encoding a computer program of instructions for executing a computer process. Accordingly, aspects may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of per-subscriber stream management. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the present disclosure have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the present disclosure.

What is claimed is:

1. A network device comprising:
a memory; and
a processor, wherein the processor is configured to:
configure a communication channel through a virtual IP address;
designate a first global site selector as a primary device for probing the virtual IP address;
designate a second global site selector as a standby device for probing the virtual IP address, wherein the first global site selector and the second global site selector are part of a mesh comprising a plurality of global site selectors;
receive a pull request at the first global site selector and the second site selector from one of the plurality of global site selectors, wherein the pull request comprises a request for the status of the virtual IP address stored on the primary global site selector and the status of the virtual IP address stored on the standby global site selector; and derive an combined virtual IP address status from the status of the virtual IP address stored on the primary global site selector and the status of the virtual IP address stored on the standby global site selector, wherein deriving the combined virtual IP address status comprises computing the logical AND of the status of the virtual IP address stored on the primary global site selector and the status of the virtual IP address stored on the standby global site selector.

2. The network device of claim 1, wherein the processor is further configured to:

send a first probe request to the virtual IP address from the first global site selector;

send a second probe request to the virtual IP address from the second global site selector; and share a result of the first probe request with each of the plurality of global site selectors except for the second global site selector.

3. The network device of claim 2, wherein the processor is further configured to:

receive a pull request at the first global site selector from one of the plurality of global site selectors, wherein the pull request comprises a request for the status of the virtual IP address.

4. The network device of claim 3, wherein the pull requests are received periodically at a predetermined frequency.

5. The network device of claim 3, wherein the processor is further configured to:

detect that status of the virtual IP address has changed; and share the status of the virtual IP address with the plurality of global site selectors.

6. The network device of claim 3, wherein the processor is further configured to:

detect that the system load has changed more than a predetermined amount; and share the status of the virtual IP address with the plurality of global site selectors.

7. The network device of claim 5, wherein the processor is further configured to:

determine that one of the plurality of global site selectors has missed a plurality of consecutive virtual IP address status updates; and send a request to the standby global site selector for the virtual IP address status.

8. The network device of claim 7, wherein the processor is further configured to:

add a new global site selector to the mesh; and receive a request to share the virtual IP address status from the new global selector site.

9. The network device of claim 1 wherein the processor is further configured to:

send a first probe request to the virtual IP address from the first global site selector;

send a second probe request to the virtual IP address from the second global site selector; and share a result of the first probe request and a result of the second probe request with each of the plurality of global site selectors.

10. The network device of claim 1, wherein deriving the combined virtual IP address status comprises computing the logical OR of the status of the virtual IP address stored on the primary global site selector and the status of the virtual IP address stored on the standby global site selector.

11. The network device of claim 1, wherein the processor is further configured to:

determine that one of the plurality of global site selectors has missed a plurality of virtual IP address status updates; and operate the one of the plurality of global site selectors with classic keepalive probing.

* * * * *